United States Patent [19]

Roberts

[11] Patent Number: 5,777,222
[45] Date of Patent: Jul. 7, 1998

[54] FLUID METER WITH MODULAR AUTOMATIC METER READING UNIT

[75] Inventor: John A. Roberts, Camberley, England

[73] Assignees: UGI Meters Limited; Smith Meters Limited, both of London, United Kingdom

[21] Appl. No.: 833,922

[22] Filed: Apr. 10, 1997

[51] Int. Cl.$^6$ ................................................. G01F 3/08
[52] U.S. Cl. .................................................... 73/273
[58] Field of Search ........................................ 73/273

[56] References Cited

U.S. PATENT DOCUMENTS

| | | | |
|---|---|---|---|
| 1,073,386 | 9/1913 | Bassett | 73/273 |
| 1,190,705 | 7/1916 | Bassett | 73/273 |
| 3,093,307 | 6/1963 | Hague et al. | 73/273 |
| 3,425,275 | 2/1969 | Russell et al. | 73/273 |
| 3,778,795 | 12/1973 | Campman et al. | 340/188 |
| 4,027,523 | 6/1977 | St. Clair | 73/3 |
| 4,409,848 | 10/1983 | Lutz | 73/861.28 |
| 5,025,470 | 6/1991 | Thornborough et al. | 379/107 |
| 5,111,682 | 5/1992 | Halpin | 73/3 |
| 5,515,722 | 5/1996 | Roberts | 73/263 |
| 5,590,179 | 12/1996 | Shincovich et al. | 379/107 |

*Primary Examiner*—Richard Chilcot
*Assistant Examiner*—Jewel Thompson
*Attorney, Agent, or Firm*—Marshall, O'Toole, Gerstein, Murray & Borun

[57] ABSTRACT

A fluid meter includes a casing, a lever within the casing that oscillates in response to the flow of fluid through the meter and an attachment mechanism that mounts an automatic meter reader to the casing in proximity to the lever. A magnet is attached to the lever so that movement of the lever creates a changing electromagnetic field external to the casing. The changing electromagnetic field is detected by and operates to actuate the automatic meter reader. As a result, the automatic meter reader detects fluid flow in the fluid meter without being directly connected to, or interfering with the operation of, a mechanical meter index associated with the fluid meter.

25 Claims, 2 Drawing Sheets

FLUID METER WITH MODULAR AUTOMATIC METER READING UNIT

FIELD OF THE INVENTION

The present invention relates generally to fluid meters and, more particularly, to fluid meters adapted to receive and operate in conjunction with automatic meter readers.

BACKGROUND OF THE INVENTION

Automatic meter readers (AMRs) are typically used with fluid meters, such as gas meters, to track the flow of a fluid through fluid meters electronically and to communicate an indication of the detected fluid flow to some external receiver via, for example, a wireless transmitter/receiver connection, a telephone wire, or some other communication channel. Once the AMR is installed, the service or fluid provider, e.g., the gas company, can poll the AMR from a remote location and receive an indication of the fluid flow measured by the meter using, for example, microwave communication, telecommunication or other communication technology embedded in the AMR.

To connect an AMR to a conventional fluid meter, such as a gas meter, the standard mechanical meter index of the gas meter is removed and replaced with components of the AMR. The mechanical meter index is then reinstalled over the AMR, and the original cover is discarded and replaced with a larger cover that secures both the AMR and the mechanical meter index to the fluid meter. Installation of an AMR on most fluid meters is difficult because these meters must be partially disassembled to connect the AMR thereto. Such disassembly is typically time-consuming and can be expensive.

SUMMARY OF THE INVENTION

The present invention is directed to a fluid meter having an AMR mounting and actuation system that mounts an AMR on the fluid meter in a non-intrusive, modular manner without necessitating the disassembly of the fluid meter.

According to one aspect of the present invention, a fluid meter adapted to be coupled to an AMR includes a casing having an attachment mechanism that accepts the AMR, a lever that moves in response to a fluid flow through the fluid meter and a magnet attached to the lever for creating an electromagnetic field external to the casing. The fluid meter may include a mechanical meter index operatively connected to an index gear wheel that moves in response to a fluid flow through the fluid meter. An index cover may be disposed proximate the mechanical meter index and the lever. The lever preferably includes an opening therein that receives a cam attached to the index gear wheel so that rotation of the cam causes the lever to oscillate. Preferably, operation of the lever and the attachment mechanism does not interfere with the operation of the mechanical meter index.

According to another aspect of the present invention, a fluid meter includes a casing having a first attachment mechanism thereon, a lever having a portion that moves in response to fluid flow through the meter and a device connected to the lever for creating an electromagnetic field external to the casing. An AMR includes a cover having a second attachment mechanism that engages the first attachment mechanism such that, when the first and second attachment mechanisms are engaged, the AMR detects the electromagnetic field external to the casing.

According to a still further aspect of the present invention, a method of detecting the flow of a fluid through a fluid meter using an AMR includes the steps of generating an electromagnetic field in proximity to a fluid meter casing, changing the electromagnetic field in response to the flow of the fluid through the fluid meter and providing an attachment mechanism on the casing for mounting the AMR at a predetermined position so that the AMR detects the changing electromagnetic field and, thereby, detects the flow of the fluid through the fluid meter.

The present invention may best be understood with reference to the following description when considered with the accompanied drawings.

DETAILED DESCRIPTION OF THE PREFERRED EMBODIMENTS

Figure 1:
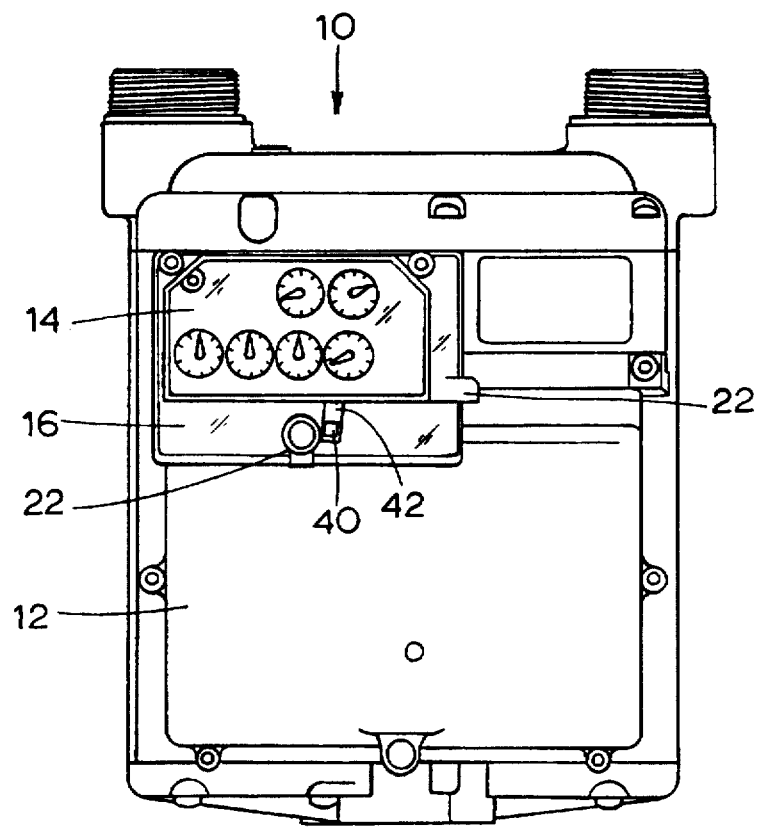
FIG. 1 is a front elevational view of a fluid meter according the present invention.
Figure 2:
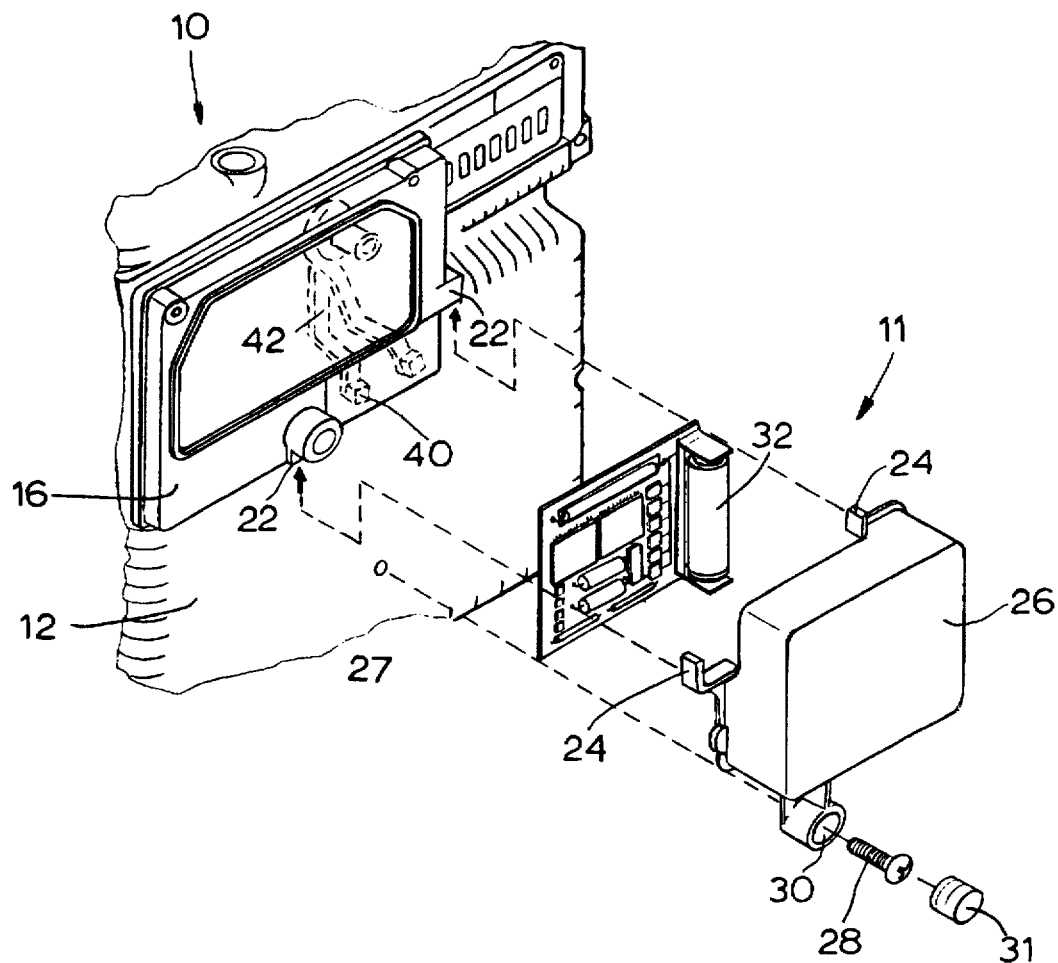
FIG. 2 is a partially exploded, isometric view of the fluid meter and a modular AMR according to the present invention.

FIG. 1 illustrates a fluid meter 10 according to the present invention while FIG. 2 illustrates the fluid meter 10 having an AMR 11 attached thereto according to the present invention. The fluid meter 10, which may be a gas meter, is illustrated herein as the fluid meter disclosed in U.S. Pat. No. 5,515,722, issued to Roberts on May 14, 1996, entitled "Gas Meter with Unitary Central Core Defining Multiple Flow Passages," which is hereby expressly incorporated by reference herein. However, the principles described herein may be applied to and used with other fluid meters as well.

As illustrated in FIG. 1, the fluid meter 10 includes a casing 12, a mechanical meter index 14 and a transparent index cover 16 disposed over the mechanical meter index 14. The internal components of the casing 12, including the details of a gearing mechanism that drives the mechanical meter index 14, are disclosed in U.S. Pat. No. 5,515,722 and, therefore, are not described in great detail herein. Generally speaking, the casing 12 includes multiple fluid chambers coupled between a fluid inlet and a fluid outlet, a diaphragm that moves in response to fluid flow through the chambers, and a gearing mechanism coupled to the diaphragm that drives the mechanical meter index to meter the oscillations of the diaphragm, all in manners known in the art.

As illustrated more clearly in FIG. 2, the casing 12 and/or the index cover 16 include an attachment mechanism that enables the AMR 11 to be attached thereto in a modular and efficient manner without disassembling or removing the mechanical meter index 14 or the index cover 16 from the fluid meter 10. In particular, the index cover 16 and/or the casing 12 includes slots 22 that receive corresponding tabs 24 located on an AMR cover 26 to enable attachment of the AMR cover 26 and, therefore, the AMR 11, to the fluid meter 10 at a predetermined position. A hole 27 on the casing 12 receives a screw 28 (or other fastener) disposed through a hole 30 on the AMR cover 26 to secure the AMR cover 26 to the casing 12 in a removable manner. A seal 31 inserted into the hole 30 covers a head of the screw 28. Although attachment of the AMR 11 to the fluid meter 10 is illustrated herein using slots and/or holes on the index cover 16 and/or the casing 12 and tabs on the AMR cover 26, any other desired removable or modular attachment apparatus may be used as well including, for example, magnets, hinge and latch arrangements, etc. Likewise, the tabs 24 may be placed on the casing 12 and/or the index cover 16 while the slots 22 may be placed on the AMR cover 26 in any desired manner.

With the AMR cover 26 secured to the fluid meter 10 in the manner illustrated in FIG. 2, AMR circuitry 32 is held within the AMR cover 26 at a predetermined position with respect to the index cover 16 and the mechanical meter index 14.

Figure 3:
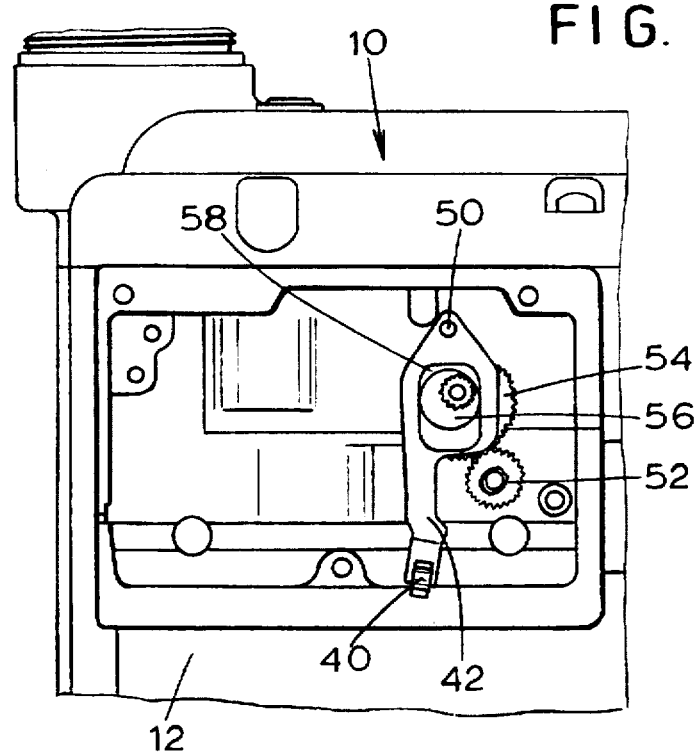
FIG. 3 is a partial front elevational view of the fluid meter of FIG. 1 with the mechanical meter index and index cover removed.

As best illustrated in FIGS. 2 and 3, the fluid meter 10 includes a lever assembly having a permanent magnet 40 attached to a lower portion of a lever 42 such that the magnet 40 is disposed adjacent the index cover 16 near the point at which the AMR circuitry 32 is held in place. The lever 42 is driven by a gearing mechanism within the fluid meter 10, e.g., the same gearing mechanism that drives the mechanical meter index 14, to oscillate near the casing 12 and/or index cover 16 without interfering with the operation of the mechanical meter index 14. Preferably, the lever 42 oscillates so that the magnet 40 moves back and forth below the mechanical meter index 14 in response to the flow of fluid through the fluid meter 10. However, the lever 42 may oscillate or move in any other desired manner.

As will be understood, the magnet 40 oscillates along with the lever 42 to create a moving or changing electromagnetic field outside of the casing 12 and the index cover 16. The strength of the electromagnetic field created by the magnet/lever configuration illustrated in FIG. 2 at a given point external to the casing 12, e.g., directly adjacent the index cover 16, varies or changes as the magnet 40 oscillates in response to the flow of fluid through the fluid meter 10. This changing electromagnetic field is detected by the AMR circuitry 32 to measure fluid flow through the fluid meter 10. To assure that the electromagnetic field created by the magnet 40 travels through the index cover 16, the index cover 16 should be constructed of a non-conducting material, such as plastic. If desired, the magnet 40 could be replaced with and electromagnet or any other device that creates a magnetic, electric or electromagnetic field outside of the casing 12 and/or the index cover 16, while the lever 42 could be another structure, such as a disc, which can cause the magnet 40 to oscillate or the electromagnetic field to change as detailed herein. Furthermore, additional and/or alternative methods of varying the electromagnetic field will be apparent to those skilled in the relevant art and are considered to fall within the scope of this invention.

The AMR cover 26 is designed so that the AMR circuitry 32 is aligned for actuation by the magnet 40 as the lever 42 oscillates in response to fluid flow through the fluid meter 10. The AMR circuitry 32 may include, for example, standard Reed switch technology that detects the moving or changing electromagnetic field to measure the flow of fluid through the fluid meter 10 without being directly coupled to the gearing mechanism inside the fluid meter 10. For example, the AMR circuitry 32 may record fluid flow (indicating, for example, gas usage) as the magnet 40 passes an actuation point somewhere within its oscillation cycle. In this manner, the AMR circuitry 32 may be designed to detect a predetermined amount of fluid flow every time the magnet 40 oscillates or otherwise moves between an actuating position and a non-actuating position, or vise-versa. If desired, the AMR circuitry 32 may be calibrated to measure the amount of fluid usage in, for example, cubic feet per electromagnetic pulse. Circuitry that detects electromagnetic pulses created by movement of a magnet between actuating and non-actuating positions, or vice-versa, is well within the knowledge of those skilled in the art and will not, therefore, be described further herein.

Movement of the lever 42 and the magnet 40 will now be described with reference to FIG. 3. The lever 42 is attached to, and oscillates with respect to, a pivot point 50 disposed on the back of mechanical meter index 14 and/or on the casing 12. The pivot point 50 permits the rotation of the lever 42. As is typically the case, an index drive gear 52 (a standard part of the fluid meter 10) is driven by the gearing mechanism disposed within the casing 12 and operates to rotate an index gear wheel 54 which, in turn, drives the mechanical meter index 14. A cam 56, which is mounted on the index gear wheel 54, is disposed within, and comes into contact with the sides of, a rectangularly shaped hole 58 formed by the lever 42. As will be understood, rotation of the cam 56 causes the lever 42 to oscillate and, thereby, causes the magnet 40 to move. In the configuration illustrated in FIG. 3, the lever 42 swings through one complete cycle each time the index gear wheel 54 makes one complete revolution. As a result of this oscillation, the magnet 40 moves back and forth from one or more actuating positions to one or more non-actuating positions so that the strength of the electromagnetic field varies (i.e., pulsates) at a point outside of the casing 12 and the index cover 16 in a manner that is detectable by the AMR circuitry 32.

A fluid meter constructed in the manner described herein allows an AMR to be quickly and easily attached thereto without the need for disassembling and removing parts of the fluid meter, such as a mechanical meter index and index cover. This arrangement reduces the time and expense involved in converting the fluid meter to enable the measurement of a flow through the meter both mechanically using the mechanical meter index, and electronically using the AMR.

While the present invention has been described with reference to specific examples, which are intended to be illustrative only and not to be limiting of the invention, it will be apparent to those of ordinary skill in the art that changes, additions, and/or deletions may be made to the disclosed embodiments without departing from the spirit and scope of the invention.

I claim:

1. A fluid meter adapted to have an automatic meter reader coupled to an exterior thereof, comprising:

a casing having an attachment mechanism adapted to accept the automatic meter reader;

a lever that moves in response to a fluid flow in the fluid meter; and means for creating an electromagnetic field external to the casing coupled to and moving with the lever so that the electromagnetic field is detected by the automatic meter reader when the automatic meter reader is coupled to the fluid meter.

2. The fluid meter of claim 1, further including a mechanical meter index operatively connected to an index gear wheel that moves in response to the fluid flow in the fluid meter.

3. The fluid meter of claim 2, further including an index cover disposed proximate to the mechanical meter index and the lever.

4. The fluid meter of claim 2, wherein the lever includes an opening and is attached to a pivot point fixed with respect to the mechanical meter index.

5. The fluid meter of claim 4, wherein the index gear wheel includes a cam disposed in the lever opening such that rotation of the cam causes the creating means to move between automatic meter reader actuating and non-actuating positions.

5

6. The fluid meter of claim 2, wherein the lever is operatively connected to the index gear wheel such that the lever moves in response to movement of the index gear wheel.

7. The fluid meter of claim 6, wherein the lever is connected to the index gear wheel such that movement of the lever does not interfere with operation of the mechanical meter index.

8. The fluid meter of claim 1, further including an index cover and wherein the creating means creates the electromagnetic field external to the casing proximate the index cover.

9. The fluid meter of claim 8, wherein the index cover is fabricated from a non-conductive material.

10. The fluid meter of claim 1, wherein the creating means comprises a permanent magnet.

11. The fluid meter of claim 1, wherein the attachment mechanism comprises one of tabs and slots.

12. A fluid meter comprising:

a casing having a first attachment mechanism thereon;

a lever having a moving portion that moves in response to fluid flow in the fluid meter;

means coupled to the moving portion of the lever for creating an electromagnetic field external to the casing; and an automatic meter reader including a second attachment mechanism that engages the first attachment mechanism such that, when the first and second attachment mechanisms are engaged, the automatic meter reader detects movement of the creating means.

13. The fluid meter of claim 12, further including a mechanical meter index operatively connected to an index gear wheel that moves in response to the fluid flow in the fluid meter.

14. The fluid meter of claim 13, wherein the lever includes an opening and is attached to a pivot point that is fixed with respect to the mechanical meter index.

15. The fluid meter of claim 14, wherein the index gear wheel comprises a cam disposed in the lever opening such that rotation of the cam causes the creating means to move between automatic meter reader actuating and non-actuating positions.

16. The fluid meter of claim 12, further including an index gear wheel and wherein the lever is operatively connected to the index gear wheel such that the lever moves in response to movement of the index gear wheel.

17. The fluid meter of claim 16, wherein the lever is connected to the index gear wheel such that movement of the lever does not interfere with operation of the mechanical meter index.

18. The fluid meter of claim 12, further including an index cover disposed adjacent a mechanical meter index, wherein the index cover is fabricated from a non-conductive material.

19. The fluid meter of claim 12, wherein the creating means comprises a permanent magnet.

20. The fluid meter of claim 12, wherein the first attachment mechanism comprises one of tabs and slots and the second attachment mechanism comprises the other of tabs and slots.

21. The fluid meter of claim 20, wherein the automatic meter reader is removable.

22. A method of detecting a flow of a fluid in a fluid meter using an automatic meter reader, comprising the steps of:

generating an electromagnetic field in proximity to a fluid meter casing of the fluid meter;

changing the electromagnetic field in response to the flow of the fluid in the fluid meter; and providing an attachment mechanism on the fluid meter casing for accepting the automatic meter reader at a predetermined position so that the automatic meter reader detects the changing electromagnetic field and thereby detects the flow of the fluid in the fluid meter.

23. The method of claim 22, wherein the steps of generating, changing and providing do not interfere with the operation of a mechanical meter index attached to the fluid meter.

24. The method of claim 22, wherein the step of generating the electromagnetic field includes the step of disposing a permanent magnet on a lever within the fluid meter casing and wherein the step of changing includes the step of coupling the lever to an index gear that moves in response to the flow of the fluid in the fluid meter.

25. The method of claim 24, further including the step of attaching the automatic meter reader to the casing in proximity to the permanent magnet.

\* \* \* \* \*